(12) United States Patent
Dupont et al.

(10) Patent No.: US 7,430,547 B2
(45) Date of Patent: Sep. 30, 2008

(54) METHOD OF DETECTING THE PRESENCE OR THE ABSENCE OF A MOBILE TERMINAL ON A PATH

(75) Inventors: Marc Dupont, Dampierre en Bay (FR); Jean-Georges Demathieu, Bourg-la-Reine (FR)

(73) Assignee: Alcatel, Paris (FR)

( * ) Notice: Subject to any disclaimer, the term of this patent is extended or adjusted under 35 U.S.C. 154(b) by 708 days.

(21) Appl. No.: 10/941,893

(22) Filed: Sep. 16, 2004

(65) Prior Publication Data

US 2005/0113111 A1    May 26, 2005

(30) Foreign Application Priority Data

Sep. 17, 2003    (FR) .................................. 03 50554

(51) Int. Cl.
  G06G 7/78   (2006.01)
  G06F 15/18  (2006.01)
  G06E 3/00   (2006.01)
(52) U.S. Cl. ............................ 706/20; 701/23; 701/24
(58) Field of Classification Search .................. 706/20, 706/23, 24
  See application file for complete search history.

(56) References Cited

U.S. PATENT DOCUMENTS 6,393,294 B1    5/2002    Perez-Breva et al.

FOREIGN PATENT DOCUMENTS

| DE | 101 18 777 A1 | 12/2002 |
| EP | 1 022 578 A2 | 7/2000 |
| GB | 2 329 801 A | 3/1999 |

OTHER PUBLICATIONS

I. Gaspard et al, "Position assignment in digital cellular mobile radio networks (e.g. GSM) derived from measurements at the protocol interface", Vehicular Technology Conference, 1997, IEEE 47th Phoenix, Arizona, May 4-7, 1997, New York, NY, May 4, 1997, XP10228911.

*Primary Examiner*—David Vincent
*Assistant Examiner*—Nathan H Brown, Jr.
(74) *Attorney, Agent, or Firm*—Sughrue Mion, PLLC (57) ABSTRACT

A method is disclosed of tracing a path to be taken by a mobile terminal receiving electromagnetic waves transmitted by transmitter stations, the path being traced by an operating platform, which method comprises a learning phase comprising a taking of the path during which, exclusively on the path, a periodic routine learning recording of successive groups of samples is made in a route memory, a sample comprising at least one value of each of the frequencies received at each of the periodic recordings, and a receive level associated with that frequency, and a comparison of the received levels between a group of $p_n$ samples recorded during a sampling of rank n and one recorded preceding group of rank lower than n, a comparison criterion discriminating between remarkable groups and ordinary groups. The method further comprises an operating phase during which the mobile terminal takes the path, and comprising periodic recording of groups of $P_i$ samples each comprising a value of each of the frequencies received at each recording and a receive level associated with the frequency, comparing each group of samples with one of the remarkable groups of samples, the comparison producing a comparison result, a presence or absence indication on the path to be taken by comparing the comparison result and a comparison criterion, and processing one or more of the presence indications to decide if the mobile terminal is on the path or not.

32 Claims, 5 Drawing Sheets

METHOD OF DETECTING THE PRESENCE OR THE ABSENCE OF A MOBILE TERMINAL ON A PATH

CROSS-REFERENCE TO RELATED APPLICATIONS

This application is based on French Patent Application No. 03 50 554 filed 17 Sep. 2003, the disclosure of which is hereby incorporated by reference thereto in its entirety, and the priority of which is hereby claimed Under 35 U.S.C. §119.

BACKGROUND OF THE INVENTION

1. Field of the Invention

The field of the invention is that of methods of recognizing that a mobile terminal is on a predetermined path to be taken. It relates in particular to methods using transmissions from fixed stations employed in mobile telephone networks.

2. Description of the Prior Art

Calculating the location (the geographical coordinates, for example the latitude and longitude) of a mobile terminal using fixed stations of a radio network and then comparing that location to that of the area in which the mobile terminal is situated is known in the art.

The least sophisticated prior art solutions offer an accuracy of no better than 300 meters on average. These solutions merely recognize a cell of a network within which the mobile terminal is situated (i.e. Cell-ID). The most advanced prior art solutions, such as the solution based on the observed time difference (OTD) technology, offer an accuracy of no better than 50 meters. These technologies take account of a latency time difference between connections to the various radio stations accessible from the current location of the mobile terminal. These solutions have the drawback of necessitating major modification of the network, however.

Also known in the art are solutions, used in particular in air and marine navigation, in which radio transmitters in the form of beacons and dedicated onboard units determine the location of the onboard unit. These solutions include goniometric triangulation, radio compasses or TACANs, and satellite positioning systems such as the Global Positioning System (GPS) and NAVSTAR.

The document DE 101 18 777 discloses a method of determining the position of a mobile radio unit using a mobile radio network comprising a multitude of radio stations that transmit radio signals that the mobile radio unit is able to receive. The method includes a preliminary step of measuring signals from a plurality of radio stations at a multitude of locations whose geographical positions are known accurately. These measurements are typically effected by a service provider and cover the whole of a town systematically. Each measurement yields a receive level/frequency profile which is stored in a profile databank in which position information is associated with each profile. During an operating phase, a mobile radio unit situated at a location whose position is to be determined receives the signals from a plurality of radio stations and measures a station profile depending on its location. The position is then determined by comparing the station profile received with the reference station profiles in the databank.

The above location method can be used to determine if a mobile terminal is on a predetermined path or not: the position of the terminal, as determined by the above location method, is compared electronically with an electronic map of the predetermined path consisting of the stored positions of a series of points constituting the path.

The above prior art method has the drawback of being very costly to implement, since it implies making receive level/frequency measurements systematically at a very large number of points (typically covering the whole of a town) and accurately storing the position of the location used to make each measurement. It also necessitates an accurate knowledge of the positions of a series of points constituting the predetermined path, as obtained, for example, by traveling along the path with a GPS receiver capable of storing a series of positions.

SUMMARY OF THE INVENTION

An object of the invention is to propose a method that is less costly to implement but nevertheless determines accurately whether a mobile terminal is in a predetermined area or on a predetermined path or not using only fixed radio stations that are not specifically provided for use in this kind of location method and, at least in a basic form of the invention, requiring no software or hardware modification of the stations of the network or the server controlling them.

The method of the invention also detects presence in, entry into, and exit from a predetermined area, and thus provides for other applications, for example recognizing that the mobile terminal is in a charging area close to the home of the user. The invention also provides for this application technical solutions which are of considerable commercial benefit.

According to the invention, during a learning phase, a path is described by the characteristics of the radio field observed while traveling along the path and remaining exclusively on the path. It is therefore not necessary to survey the whole of a town systematically or to know the geographical position of each point on the path. Nor is it necessary for the terminal to receive information on the base stations beforehand.

The characteristics of the radio field along the path are stored periodically and are the result of radio transmissions from stations of a mobile telephone network, for example. Subsequently, during what is referred to herein as "operational" traveling along the path, the characteristics of the field observed along the path are compared with the stored characteristics. From this it is deduced whether the terminal is on the path or off the path (although the point on the path or in the town to which this refers is not known). This method is easier to implement but nevertheless more accurate than existing solutions as it avoids calculating the geographical location of the mobile terminal. This calculation would necessitate approximations (dispersions and statistical calculations) and thus a considerable loss of information leading to a loss of accuracy.

It should be noted that when the expression "path according to the invention" is used herein, it may refer either to a linear route from a starting point to a destination point or to a sinuous route covering a major portion of an area, for example. The path proper will typically be the route taken by a schoolchild from his home to his school, or the return path. The sinuous path will be that of a playground in which a child may move around in all directions without leaving the area, for example. During the learning phase, the path could be a path covering the area in a spiral, for example, or consist of successive rectilinear sections offset from each other such that substantially the whole of the area has been covered. The path could also follow some or all of the actual paths for moving around the area. In all cases, during the learning phase data is stored exclusively at positions on the path.

To all of the above ends, the invention relates to a method of tracing a path to be taken by a mobile terminal capable of receiving electromagnetic waves transmitted by one or more transmitter stations, said path being traced by an operating platform, which method comprises:

A) a learning phase comprising:

a) an initial reconnaissance of the path during which, exclusively on said path, a periodic routine learning recording of successive groups of samples is made in a route memory accessible by said operating platform, a sample comprising at least one value of each of the frequencies received by said mobile terminal at each geographical position occupied by said mobile terminal at the time of said periodic recording and a receive level associated with said frequency, a periodic recording of rank k comprising a group k of $p_k$ samples, $p_k$ being an integer equal to the number of different frequencies received at the time of said recording, and b) a comparison of the received levels for a group of $p_n$ samples recorded during a current sampling of rank n and for at least one recorded preceding group of samples of rank lower than n, a comparison criterion discriminating between remarkable groups of samples and ordinary groups of samples, and B) an operating phase during which said mobile terminal takes said predefined path, said operating phase comprising:

a) periodic routine operating recording of groups of $p_j$ operating samples, an operating sample comprising at least one value of each of the frequencies received by said mobile terminal at each geographical position it occupies at the time of said periodic operating recording and a receive level associated with said frequency, the number $p_j$ of samples being equal to the number of frequencies received during said operating recording of rank j, b) comparing each group of operating samples with at least one of said remarkable groups of samples, said comparison producing a positive comparison result if, according to the comparison criterion adopted for said learning phase, said comparison result indicates that said current group would have been classified as ordinary, c) recording a presence indication relating to whether said mobile terminal is on said path to be taken or not in the event of a positive comparison result and otherwise recording an absence indication, and d) processing one or more of the recorded presence or absence indications to decide if said mobile terminal is on said path to be taken or not.

Thus, according to the invention, successive sample recordings are created, each sample corresponding to a frequency received during recording. A recorded sample for a given frequency comprises an indication enabling the frequency to be recognized, for example a channel number and a receive level. From the hardware point of view, note that mobile telephones already comprise receiver means for scanning one or more bands of frequencies liable to be received as a function of the frequencies transmitted by the radio stations of the telephone network. The above indications may already appear on a screen of the mobile telephone, for example in the form of a channel number indicating the frequency or a coefficient indicating the receive level. There is therefore no need to modify a mobile terminal from this point of view. On the other hand, the mobile terminal must be equipped with a processor programmed to store the information in an operating memory. The operating memory may be either a memory of the mobile terminal or an external memory, for example located at a server, that is accessible via the operating platform. A program for executing the method of the invention may be stored in a memory of the mobile telephone or on the operating platform. If the mobile terminal does not have all the memory and/or software means for carrying out the method, then the processor must be programmed to send the data to the operating platform for processing on the platform and to receive data from the platform.

Figure 5:
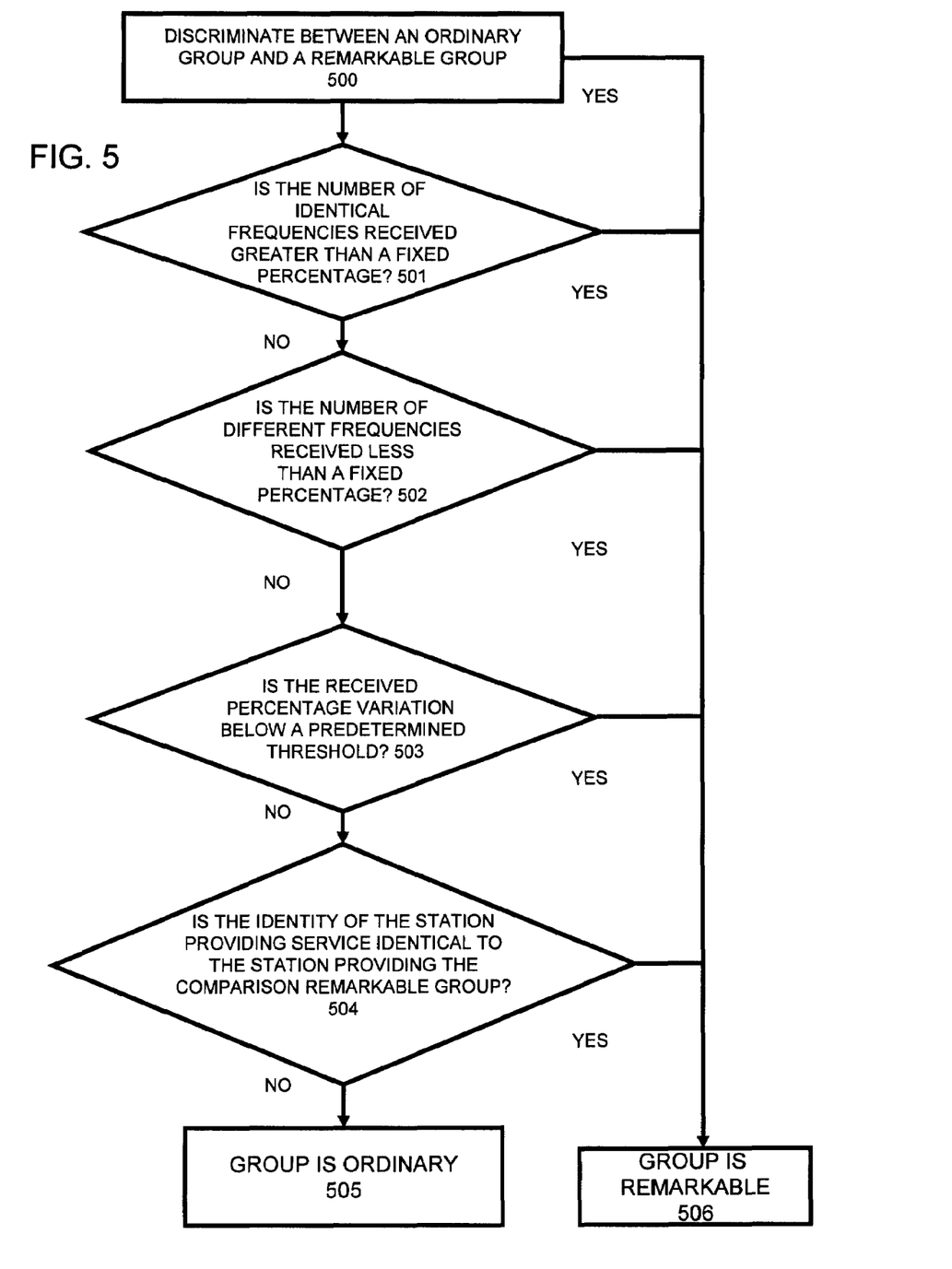
FIG. 5 represents a method for discriminating between an ordinary group and a remarkable group, according to an exemplary embodiment of the present invention.

FIG. 5 illustrates a method for discriminating between an ordinary group and a remarkable group (500), according to an exemplary embodiment of the present invention. If, in a group of samples, a number of identical frequencies received is greater than a fixed percentage (501), then group of samples is ordinary (506). If, in a group of samples, the number of different frequencies received is less than a fixed percentage (502), then the group of samples is ordinary (506). If, in a group of samples, the receive percentage variation is below a predetermined threshold (503), then the group of samples is ordinary. If, in a group of samples, the identity of the station providing service is identical to the station providing a comparison remarkable group (504), then the group is ordinary (506). If the group of samples does not satisfy any of the above-mentioned conditions, then the group is remarkable (505).

In one embodiment of the method the criterion for discriminating between an ordinary group and a remarkable group is as follows: first of all, at least one remarkable group must have been created. This may be the first group to be stored, for example. A next remarkable group is determined relative to a previous remarkable group, for example the immediately previous remarkable group. By "immediately previous" is meant that these two remarkable groups will have the remarkable group ranks r and r+1, respectively. The current recording group will be referred to as remarkable if at least one of the following conditions is satisfied:

according to a first condition, the number of frequencies received for the current group that are identical to frequencies also received for the comparison remarkable group must be less than a fixed percentage a % of the number of frequencies received for said comparison remarkable group, according to a second condition, the number of frequencies received for the current group that are different from the frequencies received at the time of said comparison remarkable recording must be greater than a fixed percentage b % of the number of frequencies received for said comparison remarkable group, according to a third condition, there must be no minimum percentage c % of identical frequencies in the comparison remarkable group and in the current group for which a receive level variation is below a predetermined threshold between a receive level associated with a frequency of the current group and a receive level associated with the same frequency of one of the samples of said comparison remarkable recording.

The group will be called ordinary if none of the above conditions applies, in other words, if at least one of the following conditions is satisfied:

according to the first condition, the number of frequencies received for the current group that are identical to frequencies also received for the comparison remarkable group is greater than the fixed percentage a % of the number of frequencies received for said comparison remarkable group, according to the second condition, the number of frequencies received for the current group that are different from the frequencies received at the time of said comparison remarkable recording is less than said fixed percentage b % of the number of frequencies received for said comparison remarkable group, according to the third condition, there exists for a minimum percentage c % of identical frequencies in the comparison remarkable group and in the current group a receive level variation, preferably expressed as a percentage, below a predetermined threshold between a receive level associated with a frequency of the current group and a receive level associated with the same frequency of one of the samples of said comparison remarkable recording.

An example will be used to guide the reader through the choice of values for the percentages a % and b %.

Consider, for example, the situation in which four samples have been stored for the comparison remarkable point, corresponding to four received frequencies. If a % is at least equal to 75% and less than 100%, then the current group will be remarkable if at least one frequency of the current group is not identical to a frequency of the comparison remarkable group. For the same number (four) of frequencies received for the comparison remarkable point, b % would have to be at least equal to 25% for the appearance of a different frequency to yield a remarkable group. As explained above, in the method of the invention, a group of samples is determined to be a remarkable group by comparison with a preceding remarkable group. Thus this criterion is not applicable to a first remarkable group. The first remarkable group may comprise the first recording to be made or be obtained by choosing a group of samples from the first i groups to be recorded, the choice being made by comparing the level characteristics of the same frequency in the i samples or the numbers of identical or different frequencies received during the i recordings.

In one embodiment, the group or each group of rank less than n with which the group of rank n is compared to determine whether said group of rank n is a remarkable group or not is a remarkable group, after determining a first remarkable group of the lowest rank r by a method other than by a comparison with remarkable groups.

In one embodiment the first remarkable group is the first group to be recorded.

In one embodiment a remarkable group is determined by comparing the current group and the preceding remarkable group of samples having the rank r of the highest ranked remarkable group, i.e. the immediately preceding remarkable group (see above).

In one embodiment a remarkable group is determined by successive two by two comparison of samples from the last i consecutive groups to be recorded, the last group of samples to be recorded having a rank n and the first group of the last i groups having the rank n−i, which comparison may yield one or more remarkable groups.

One embodiment of the method further comprises a preliminary step of storing correlation information relating to each of the transmitter stations that may be received within a large geographical area in an operating memory accessible to the operating platform. This large area encompasses at least a small geographical area containing the path to be taken. This correlation information alone, or where applicable in combination with other prerecorded correlation information, correlates a received frequency with the identity of the station transmitting that frequency on the path to be taken.

Given the above, the learning phase of the method comprises, for the remarkable groups of samples, correlating the levels and the frequencies received with the correlation information stored during the preliminary phase, this correlation linking each frequency and associated level of said remarkable group with the identity of the station that transmitted them. This information obtained from the current remarkable group of samples is also stored for each of the samples constituting the current remarkable group of $p_k$ samples.

The preliminary phase is generally not specific to the method of the invention, since the stations of mobile telephone networks generally broadcast such information, such as a global station identifier, so that the station may be identified and associated with values relating to the technical or geographical characteristics of the station. However, some of this information is not accessible to a programming card added to the mobile terminal to provide storage capacity or particular applications, such as a Subscriber Identity Module (SIM) card, for example. The SIM card receives the identity of the network station (the server cell) but, for other stations that may be received, may receive only a transmit frequency, a receive level and a color code for distinguishing network stations that transmit the same frequency. The SIM card may also receive values of coefficients C1 and C2 whose value or variation in value is used by the mobile terminal to determine if it is necessary to change the server cell.

In one embodiment comprising a preliminary phase, the correlation information received by the mobile terminal includes information relating to the identity of a station providing a particular service, for example the identity of the station acting as the server cell, i.e. the station providing the first relay station between the mobile terminal and the remainder of the network. In this case, over and above other criteria, a group may be recognized as remarkable if this kind of change of the station providing the particular service has been recognized.

In one embodiment comprising a preliminary phase values or ranges of values of parameters are stored during the preliminary phase that together define a context space and, during learning phases and operating phases:
current situation in the context space is determined, and
the frequency of subsequent recordings is modified as a function of the current situation in the context space.

The context range values may be one or more values or ranges of values relating to the following parameters, for example:
residual mobile terminal battery charge values,
values defining a location quality,
remaining memory space value ranges.

It should be noted that the context space may be defined according to the design of the application implementing the method of the invention, in which the recording frequency could be a function of mean values of the residual battery charge, the memory space known to be available for executing the application, and the quality to be assigned to the service, for example, as well as a reasonable mean duration of routes that will be processed using the application, for example.

The context situation may also be taken into account during the learning phase or an operating phase, for example to modify the sampling period during the learning phase or an operating phase. A new sampling frequency that is a function of the context and the radio profile at the remarkable point of rank r may be calculated, stored in the operating memory for the remarkable group of samples of rank r, and used in operating phases to find the remarkable group of samples of rank r+1.

In one embodiment the learning phase may be extended to encompass a plurality of passages over the path after the initial recording, in the following manner: the mechanism for detecting leaving of the path used during an operating phase, to be described in more detail below, is used here but, when leaving the path is detected, the user is interrogated to find out if he is on the path to be taken or not. If he confirms that he is on the path, the interface prompts the user to check a response; if the response is in the affirmative, the level variation threshold is modified for comparison of current groups with this remarkable group, in order for the comparison between the last remarkable group and said current group to yield a positive result.

Optionally, the time taken to acquire a remarkable group of samples since starting out on the route may also be stored in the operating memory for said remarkable group of samples. In this case, during an operating phase (see below), the result of a comparison between a current group of samples and a remarkable group is declared positive only if not only has a positive comparison result been obtained according to one of the criteria cited but also the time elapsed since starting out on the route at the time of acquiring the current sample is equal to the time elapsed since starting out on the route to acquire the remarkable group with which comparison has yielded a positive result, increased or decreased by a threshold time.

As a general rule, the invention will be implemented in the form of a computer program comprising data processing program code means adapted to execute all the steps of the method when said program is executed on a computer.

The data processing program will be incorporated in a computer readable medium.

It could also be incorporated in a plurality of media each containing computer readable instructions adapted to execute some of the steps of the method and linking instructions for sending data or instructions to the external environment.

Accordingly, the invention also relates to a medium or to a set of media for digital data and instructions together containing a program for executing the steps of the method of the invention.

One embodiment of the invention and variants thereof are described next with reference to the appended drawings.

DETAILED DESCRIPTION OF PREFERRED EMBODIMENTS

Figure 1:
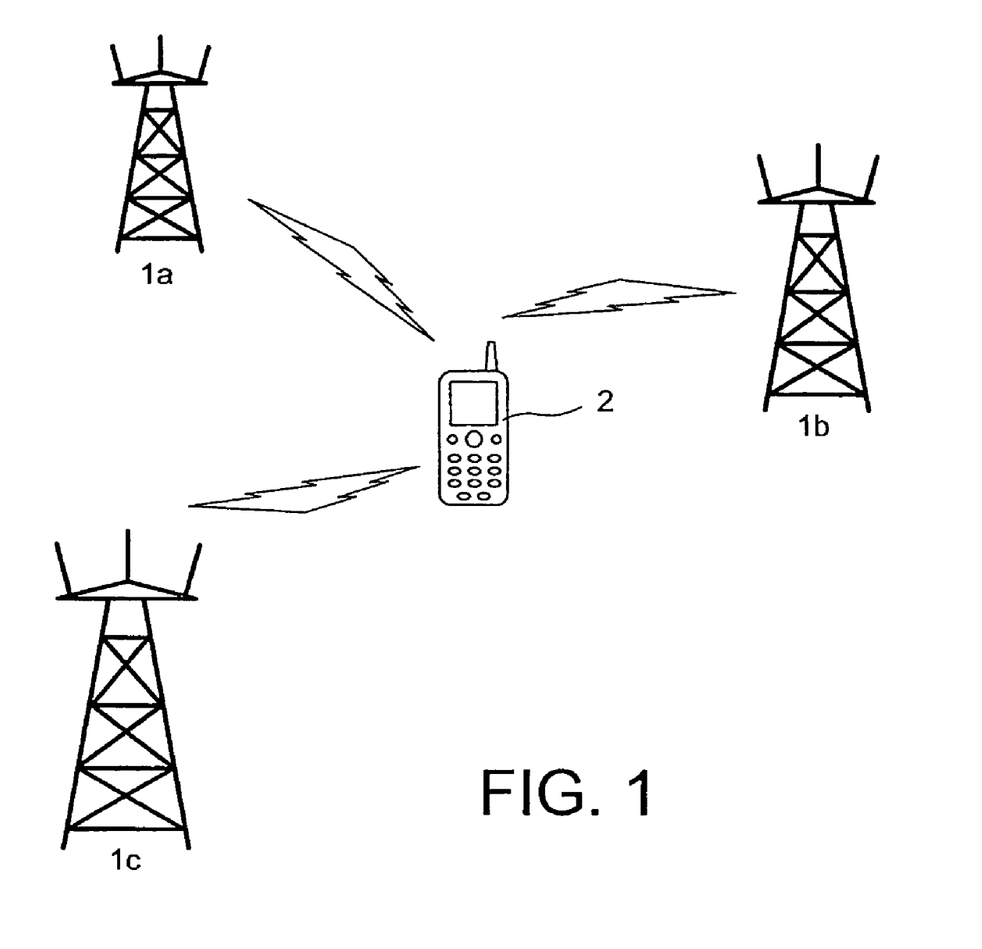
FIG. 1 represents a set of radio stations and a mobile station of a GSM mobile telephone network.

The method is implemented on a mobile terminal 2 of a GSM network represented diagrammatically in FIG. 1. The mobile terminal has a Subscriber Identity Module (SIM) card, not shown. A SIM card comprises a microprocessor connected to a memory and an interface for entering data or a program. This is known in the art. In the present embodiment, the program is stored locally on the SIM card. It is naturally possible to store the program or at least a portion thereof in a remote memory and to provide for the sending of data to that memory from the mobile terminal.

The mobile terminal 2 is represented in a position in which it receives transmissions from three radio stations 1a, 1b and 1c forming part of the GSM network. Without modification of the mobile station 2 equipped with the SIM card, it is possible to receive and to store on the card a global identity GIDa for one of the stations, for example the station 1a that constitutes the server cell or station. When it is correlated with an information table, this global identity locates the cell 1a geographically. For the other two stations 1b and 1c that are not server cells, it is possible to receive and to store on the SIM card respective frequency and color information, also known as the local identity LIDb and LIDc. As explained above, this color information is for distinguishing all the stations in a geographical area that transmit the same frequency from each other. Of course, two stations that transmit the same frequency with the same color code are not in the same geographical area. It is therefore possible, to determine the global identity of the other stations, such as the stations 1b and 1c, if the geographical area in which the mobile terminal is situated is known from the global identifier of the server cell and from the local identifiers of other frequencies received.

Figure 2:
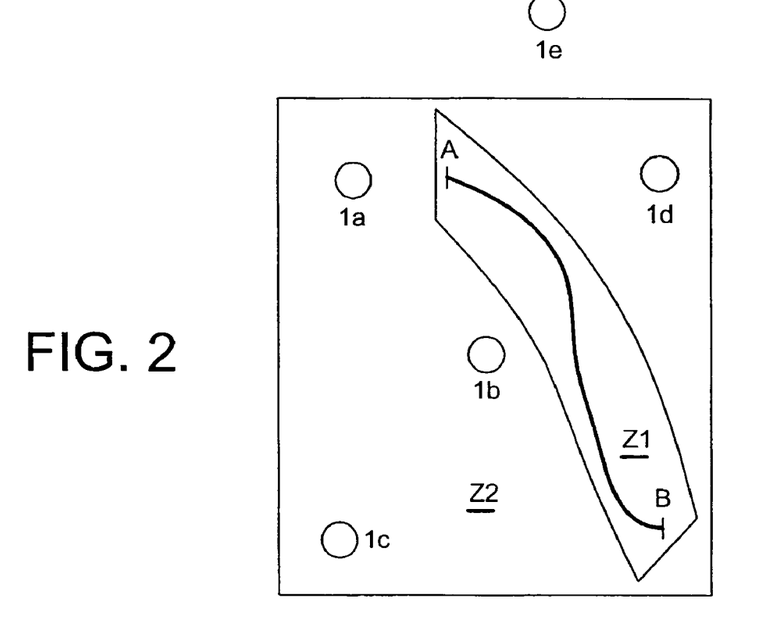
FIG. 2 represents a set of radio stations and a first example of a path to be taken.

FIG. 2 represents a first path to be taken between two points A and B. In FIG. 2 the path is linear and corresponds to the situation in which a parent wishes to know that a child is indeed on the path that leads from its home A to its school B, for example.

Figure 3:
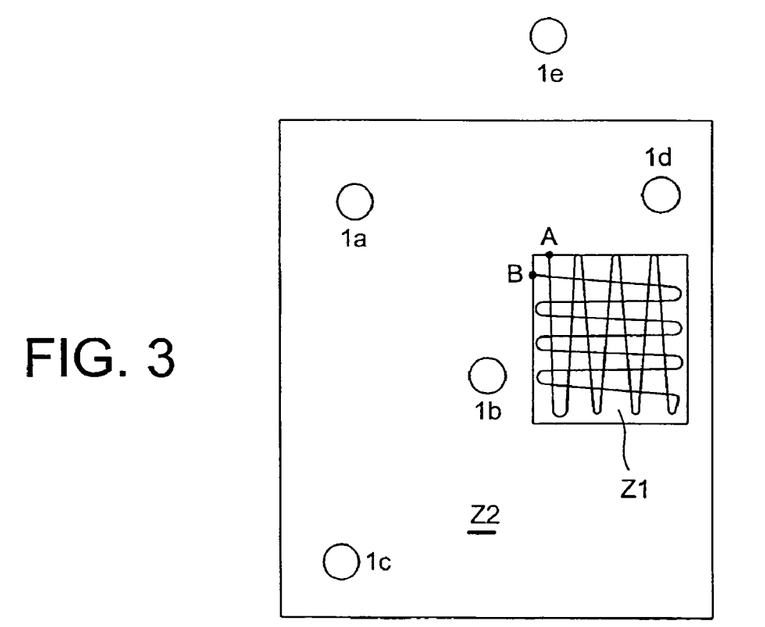
FIG. 3 represents a set of radio stations and a second example of a path to be taken.

FIG. 3 corresponds to a second example of a path to be taken. In FIG. 3 the path is also linear, but it is sinuous and it will be noted that the path is entirely situated within an area, for example a square area, that may be divided into a matrix made up of rows and columns. The path involves moving along a first column in one direction, then the adjacent column in the opposite direction, and so on until the last column is reached. In the example shown, the path is completed by taking a similar route along the rows of the matrix. This corresponds to a situation in which a parent wishes to know that a child is in a playground that it may move around in all directions, for example. It is naturally not obligatory for a route to be taken along the rows and the columns of the path, this merely constituting an example. As a general rule, existing paths in the area are taken, for example footpaths in a park.

In FIG. 2 and FIG. 3 the path is within a small geographical area Z1. In the embodiment described here, to exploit the possibility referred to above of working back from local identities to global identities, correlation data is recorded beforehand. This data relates to the radio stations 1a, 1b, 1c, 1d and 1e. These stations are at the least those that cover a large geographical area Z2. This large geographical area Z2 must encompass at least the small area Z1 in which the path to be taken is situated. The data may further encompass other stations covering a much larger area than the area Z1 containing the path, so that other paths may be covered in other small areas inside the large area covered. In the embodiment described here the previously recorded data comprises transmission frequencies in the form of the numbers of the channels on which the radio stations 1a, 1b, 1c, 1d and 1e operate, the global and local identities of those stations, and their geographical coordinates. Thus by correlating this data with the frequencies and their local identifiers actually received during a recording made in the learning phase, it is possible to add the global identity and the geographical location of the received station to the recording of a sample of a remarkable group relating to a received frequency. This portion of the method of the invention will be evident to the person skilled in the art and will not be described further.

Figure 4:
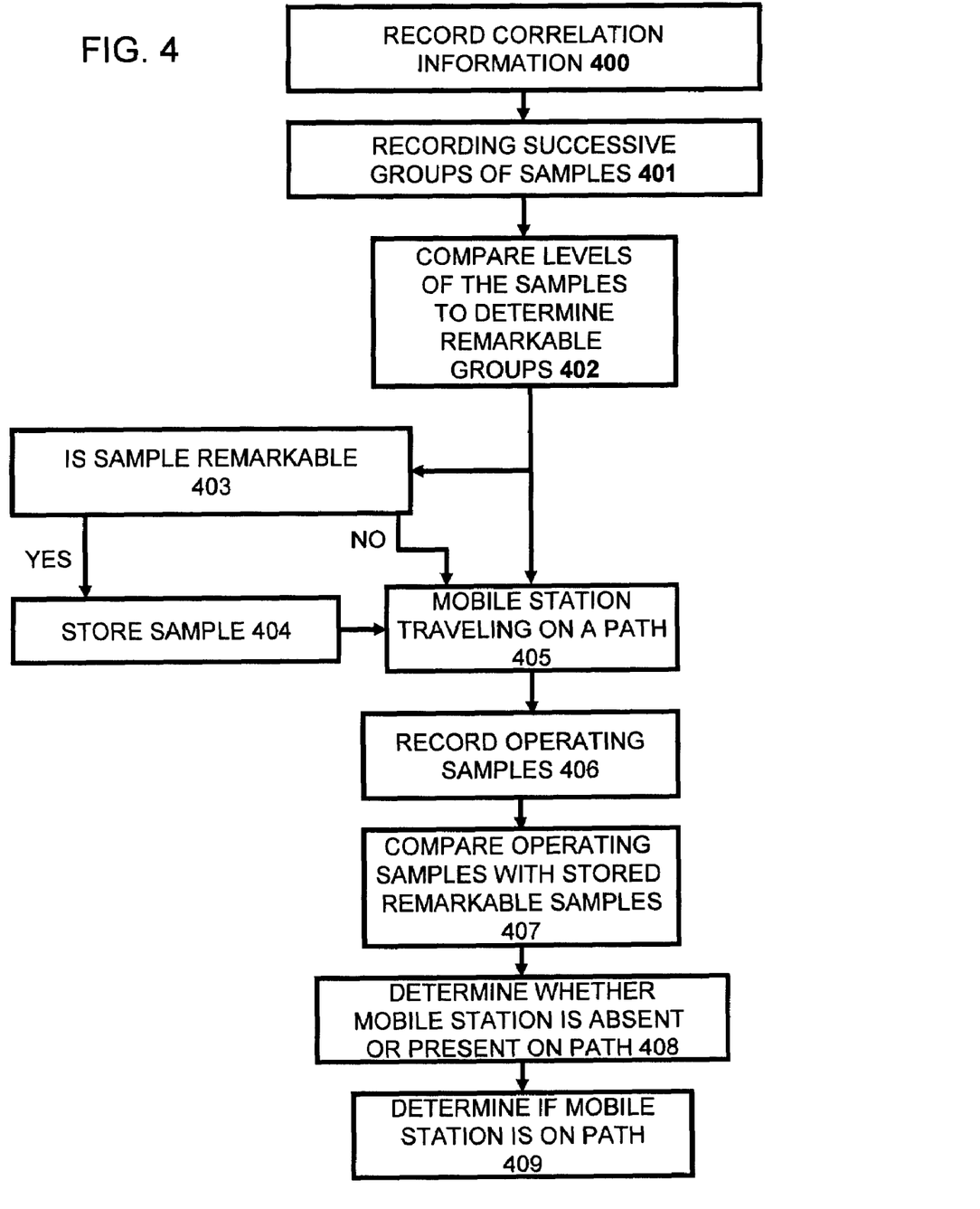
FIG. 4 represents a method of tracing a path to be taken by a mobile terminal, according to an exemplary embodiment of the present invention.

FIG. 4 illustrates a method of tracing a path to be taken by a mobile terminal, according to an exemplary embodiment of the present invention. During a preparatory phase of recording in an operating memory accessible to the operating platform correlation information relating to each of the transmitter stations is recorded (400). Here, successive groups of samples are recorded (401). The successive groups of samples are compared to remarkable groups of samples to determine remarkable groups (402). If a sample is determined to be remarkable (403), the sample is stored (404). However, if a sample is determined not to be remarkable, the sample is deleted. During an operation phase (405), in which a mobile terminal operates on a path, operating samples are recorded (406). The operating samples are then compared to the remarkable samples stored during the learning phase (407). Using the comparison results, it is determined whether the mobile station is absent or present on the path (408). If it is not determined that the mobile station is absent from the path, then it is determined if the mobile station is on the path (409).

There is also recorded preliminary context information in the form of:
mobile terminal battery residual charge value ranges,
values defining a location quality, and
remaining memory space value ranges.

The learning phase is described next. The user of the mobile terminal 2 starts out from the point A. An indication that the learning stage for a new path is beginning is entered by the user, together with an indication of the quality level at which the path is to be recorded. An indication is also entered to discriminate a linear path corresponding to a route between a point A and a point B from a sinuous path corresponding to an area. This information is entered via an interface of the mobile terminal. A first recording of the frequencies received and their receive level is made. Information is recorded for identifying the server cell. The server cell selection coefficients C1 and C2 are recorded. In the program described here, this first recording is arbitrarily declared to constitute a remarkable recording.

Thus a sample of the first recording or generally of a remarkable group contains for each received station a global station identity, a receive level value, and an indication as to whether the cell is a server cell or not (the cell is a server cell when it is actually being used for a mobile telephone connection at the time concerned), this later indication taking the form of the value of a bit, for example. The group of samples is identified by a number, for example, 1 for the first and r for the remarkable group of samples of rank r, by an elapsed time since the start of the recording, which is equal to 0 for the first recording, by the time elapsed since starting out on the route for the remarkable group of samples of rank r, and finally by a value for each of the coefficients C1 and C2 used to select the server cell.

In a first implementation, the current group of samples is stored in buffer memory. If the comparison with the last remarkable group does not lead to the group being declared remarkable, it is deleted and replaced by the next group of samples; otherwise it becomes a remarkable group and is copied into the permanent memory for remarkable groups. This minimizes the memory space used.

In a second implementation, all the samples are stored and the remarkable groups are assigned a flag. The remarkable group flag is intended to be used for deleting ordinary groups of samples, for example at the end of the learning phase or periodically during the learning phase.

As a function of the quality level at which the path to be taken is to be recorded, and the remaining battery charge, the program determines a frequency for recording subsequent samples. The next sample is recorded at a time depending on the frequency determined in this way. For each group of samples recorded:
whether it is a remarkable recording or an ordinary recording is determined, and for this purpose:
the received stations are identified,
the receive level for the current group of samples is compared with the receive level for the same station for the preceding remarkable group of samples. If, for a minimum percentage c % of the stations received at the same time during the recording of the preceding remarkable group of samples and for the current group, the percentage level difference between the level recorded for the preceding remarkable group of samples and the level recorded for the current group of samples is below a predetermined threshold, the current group of samples is declared an ordinary group; otherwise it is declared a remarkable group. The values of the threshold and of c depend on the receive level for the frequency concerned. A current group of samples declared to be a remarkable group may be marked by means of a flag.

It will be noted that in the learning phase that has just been described the first group of samples is declared to be a remarkable group and that the other remarkable groups are obtained by comparing the current group of samples with the preceding remarkable group.

A predetermined number i of groups of samples may be recorded in a different embodiment of the learning phase. The number i is not less than the number of groups for which it is estimated that a remarkable group must be available. Only a minimum value may be fixed for the number i, its real value being fixed by the software as a function of the space available in the operating memory and the situation in the context space. The frequencies whose levels appear in the i groups of levels are compared, and the groups for which one or more new frequencies have appeared or frequencies have disappeared relative to the preceding group and the values of the coefficients C1 and C2 are noted. The remarkable groups are chosen from the i groups using the selection method of the present invention, iteratively and increasing or decreasing the thresholds, if necessary, to reduce or increase the number of remarkable groups among the i groups.

After the remarkable groups have been recorded in the manner indicated above, the i recordings comprise a certain number of remarkable groups.

The numbers of ordinary groups and groups remaining between the various ranges between consecutive remarkable groups are then counted and, if the number of ordinary groups in one of these ranges is above a threshold which is predetermined as a function of the quality coefficient, then the levels of the various received frequencies in that range are re-examined, together with the values of the coefficients C1 and C2, and a remarkable group based on the result of this comparison is added to the range.

The same operations are carried out on i other records if no input indicating the end of the learning route is received via the interface.

A record of remarkable groups is available at the end of the learning phase.

These remarkable groups are used during an operating phase to determine whether the mobile terminal is on the path to be taken or not.

During an operating phase, the path tracing application is started either manually by the user of the mobile, or by another user connected to the mobile via the network, or automatically by a path tracing agenda management program that activates the application and gives it the identifier of the path to be monitored at the required time on the required day, this management program being stored in the mobile, on a server, or in another mobile connected to the mobile via the network. The operating phase, during which the terminal travels along the predetermined path, comprises periodic recording of groups of $P_i$ operating samples, frequency values and associated receive levels, the identity of the cells that transmitted the received frequencies, that identity being determined by means of the previously recorded correlation information, the identity of the server cell, and the levels of the coefficients C1 and C2. The number $P_j$ of samples is equal to the number of frequencies received during the operating recording of rank j. The period is preferably the same as in the learning phase. It may be different, however, and in particular it may be fixed as a function of the current context situation and previous context data.

The radio environment corresponding to each group of samples recorded during the operating phase is compared to that of one or more remarkable groups acquired during the learning phase and stored in the operating memory. This set of remarkable groups may comprise:

either all the remarkable groups recorded on the path to be taken, this situation corresponding to that described with reference to FIG. 3, where the aim is to find out if the mobile terminal is within a predefined area, or the first remarkable group of the path recorded; if the result is not positive, i.e. if it does not correspond to a comparison result leading to an indication that the mobile terminal is on the path, then the current group is additionally compared to the remarkable group of rank 2 and where applicable to each of the remarkable groups from rank 2 to rank 2+s. This corresponds to a situation in which the starting pulse is delayed. It has therefore been verified that the terminal is on the path to be taken, but not necessarily at the beginning of that path.

If the result of a comparison with the current group is positive for a remarkable group of rank r, it is assumed that the mobile terminal is between the remarkable group of rank r and the remarkable group of rank r+1. When comparing a group of samples with the group of rank r ceases to yield a positive result, a comparison is effected with the group of rank r+1, and where appropriate with the groups of rank r+1+s, until a positive comparison result is obtained.

Tracing the path to be taken is then resumed for the group for which a positive comparison result has been obtained.

Thus it is seen that the number s of remarkable groups with which the current group is compared during the operating phase is a function of the permitted time offset between the actual starting time and the indication of starting given to the terminal or to the network and a function of travel speed differences between acquisition and operating phase travel speeds. If the comparison with the s+1 remarkable groups or all the remarkable groups, as appropriate, does not lead to a positive indication of the presence of the mobile terminal at a point on the path to be taken, then the options are, depending on the quality of service that has been requested:

either to conclude immediately that the mobile terminal is not on the path to be taken, or to note an indication of non-presence on the route which, in the preferred embodiment, is completed by the rank q of the last remarkable recording with which the comparison of a current group yielded a positive result.

Then a number p of comparisons with all or some of the remarkable groups is effected. If all the comparisons yield a negative result, the conclusion is that the terminal is not on the path; otherwise, the tracing of the path resumes from the first comparison to yield a positive result. The value of the number p depends on the quality of service that has been requested.

Alternatively, comparison is resumed for one or more subsequent current groups. A current group immediately following a current group for which an indication of non-presence on the route has been recorded is compared with all the remarkable groups, preferably starting from the remarkable group of rank q of the last remarkable recording with which comparison with a current group has yielded a positive result.

If a positive comparison result is obtained, the remarkable group or groups for which the comparison result is positive are noted and a positive presence indication is recorded for the current group followed by the ranks of the remarkable groups for which a positive comparison result has been obtained. Thus comparison is resumed for h consecutive current groups following a current group for which no indication of presence on the path to be taken has been obtained.

After recording the results of the comparisons of the h consecutive current groups, whether a ratio between the number of positive indications and the number h of groups is above a predetermined threshold is determined; if it is not, the conclusion is non-presence of the mobile terminal on the path to be taken. If the ratio is above the predetermined threshold, whether there exists in the succession of groups that yielded a positive indication a coherent progression of the rank of the remarkable groups is determined. A progression of the rank of the remarkable groups is coherent if the same remarkable group is found for all the groups that yielded a positive indication or if a progression of the value of the rank of the remarkable groups in the same direction as the progression of the rank of the h current groups is observed. If a configuration of this kind exists, then the decision is that the mobile station is on the route. The negative indications are deleted. Comparison of the current groups resumes with the remarkable group having the highest rank in the progression.

If the progression of the rank of the remarkable groups is not coherent, but erratic, i.e. if there are found for the positive indications of the h groups, for example, only ranks of remarkable groups that are neither constant nor progressing in a regular fashion, but (for example) increasing and then decreasing, or decreasing constantly, the conclusion is that the positive indications are coincidences and it is declared that the mobile terminal is either not on the path to be taken or is not progressing in the expected fashion along the path to be taken.

The results of comparing a current group recorded during the operating phase and a remarkable group leading to a positive presence indication or to a negative indication are described next. A positive result leads to a positive presence indication. If none of the results of comparing a current group of samples and a remarkable group is positive, then a negative presence indication is obtained.

The result of comparing a current group of samples and a remarkable group is positive during the operating phase if the same criteria that were used for the acquisition of remarkable points in the learning phase are not satisfied. In other words, if a current group of samples is declared non-ordinary, i.e. remarkable, in the operating phase, according to the combination of conditions adopted during the learning phase, then the recognition that a point is ordinary according to the same criteria will lead to what is called a positive comparison result. A positive result constitutes a positive indication of presence on the path to be taken.

In the embodiment described here the values of the percentage c % and threshold percentage are adjusted automatically as a function of the receive level. For a receive level from 10 to 25, a typical threshold follows a curve from the following family (number of stations, family of typical threshold values by percentage variation): (2, 3-5%), (3, 7-20%), (4, 20-40%), (7, 35-60%).

As stated above, in the particular embodiment described here, the method comprises a preliminary phase of recording correlation data and context data. The context data contains a coefficient relating to quality of service. In this case, the values of the percentages a % and b % are adjusted taking account also of the value of the coefficient relating to quality of service.

It should be noted that, in this method, during the learning phase, the first current group recorded in a shadow area, i.e. an area in which no station is received, is a remarkable group because the number of identical stations received will be below the fixed threshold. Similarly, the first group of samples recorded after leaving the shadow area will be a remarkable group because the percentage of different frequencies relative to the preceding remarkable group will be greater than the fixed percentage. In the preferred embodiment of the method of the invention, if the number of frequencies received becomes equal to 0, a recorded sample group counter is started. When the number of frequencies received is again different from 0, the counter is stopped. According to the invention, if the number q in the counter is above a predetermined fixed value then an alarm is given to indicate that the shadow area is too large.

The number q may be fixed or calculated as a function of the service value present in the context information.

The shadow area information may be collected. On the basis of shadow area entry and exit information collected by the remarkable groups and using information from the database of the stations, the geographical location of the shadow areas may be determined, which enables an operator to identify the presence and the location of shadow areas and thus to improve the coverage of his network thanks to the users of an application using the proposed method, who thus all become network quality of service testers.

Accordingly, in this embodiment of the invention, account is taken of the number of frequencies received for each of the current groups of samples, and if that number falls to 0, indicating a location in a shadow area of the telephone network, a counter of the current sample groups for which this number is equal to 0 is incremented, and a shadow area detection message is sent to the network operator after the first current group of samples for which the number of frequencies received is greater than 0.

The paths may be acquired by one or more terminals other than that or those used in the operating phase. The paths acquired are communicated to the server or terminals responsible for the operating phase, for example via the same radio network. For example, this configuration enables the manager of a chain store to use his mobile telephone to record an area corresponding to the surroundings of the store. The description of the areas is then downloaded to the mobiles of potential customers via the network. Then, an application on the mobile is awakened at regular intervals, samples the network environment, and uses the method of the invention to compare the group of samples obtained to the various remarkable groups downloaded. If any of the comparisons yields a positive result, the application sends a message to a server that sends information on current promotions to the mobile in the vicinity of the store.

Thus according to this embodiment and use of the invention, remarkable points covering a predetermined area are recorded, the operating phase of the method of the invention is awakened periodically, for example between certain times, and information is transmitted to a mobile terminal if the method of the invention indicates that the mobile terminal is in said area.

In the preferred embodiment, there is further provision for taking account of changes to the network that may intervene between the end of the learning phase and the current time.

Such changes are generally of three kinds:
change of local identifier of cells participating in the network, for example: GSM network pair (channel, BSIC) that is unique only in a small geographical area,
addition of new cells, and
removal of existing cells.

The proposed method adapts to local identifier changes in the following manner:

In the learning phase, for each remarkable group, a vicinity area of the cell identified by its global identifier is defined according to its geographical coordinates $(x_a, y_a)$. The coordinates are accessible in the information recorded beforehand. In this area, the local identifiers of the other cells that constitute groups of samples are unique, and thanks to the information recorded beforehand the global identifiers of these cells are added to each of the samples of the group. For GSM and GPRS networks, the vicinity area may in practice be defined by a disc with a radius of 6 km, for example, or by a square with a side length of 6 km, the center of which is the cell identified by its global identifier.

In the operating phase, all the local identifiers of the global identifiers of the path concerned may be updated from updates to a database of network information for updating the information recorded beforehand. Accordingly, to change a local identifier, the update is effected by a connection to the network information broadcast on the network.

If, during the operating phase, comparison of a current group of samples and a remarkable group yields a positive result, but the comparison result indicates that one or more new cells are received, then the new cells are the subject of additional samples added to the remarkable group with which the current group is compared, thus ensuring the maintenance of said remarkable group. The network database may optionally be verified:

If the new cells are referred to in the network database but their location in the base is not in the vicinity of the path to be taken, then a fault indication is sent.

If, during the operating phase, comparing a current group of samples and a remarkable group yields a positive result, and if, additionally, during the comparison, one or more cells attended to in the learning phase are not attended to in the operating phase, then those cells may be eliminated from the information on the stored path to be taken, thus maintaining the latter. The network database may optionally be verified: if the cells not seen are still present in the base, a problem is reported.

Figure 6:
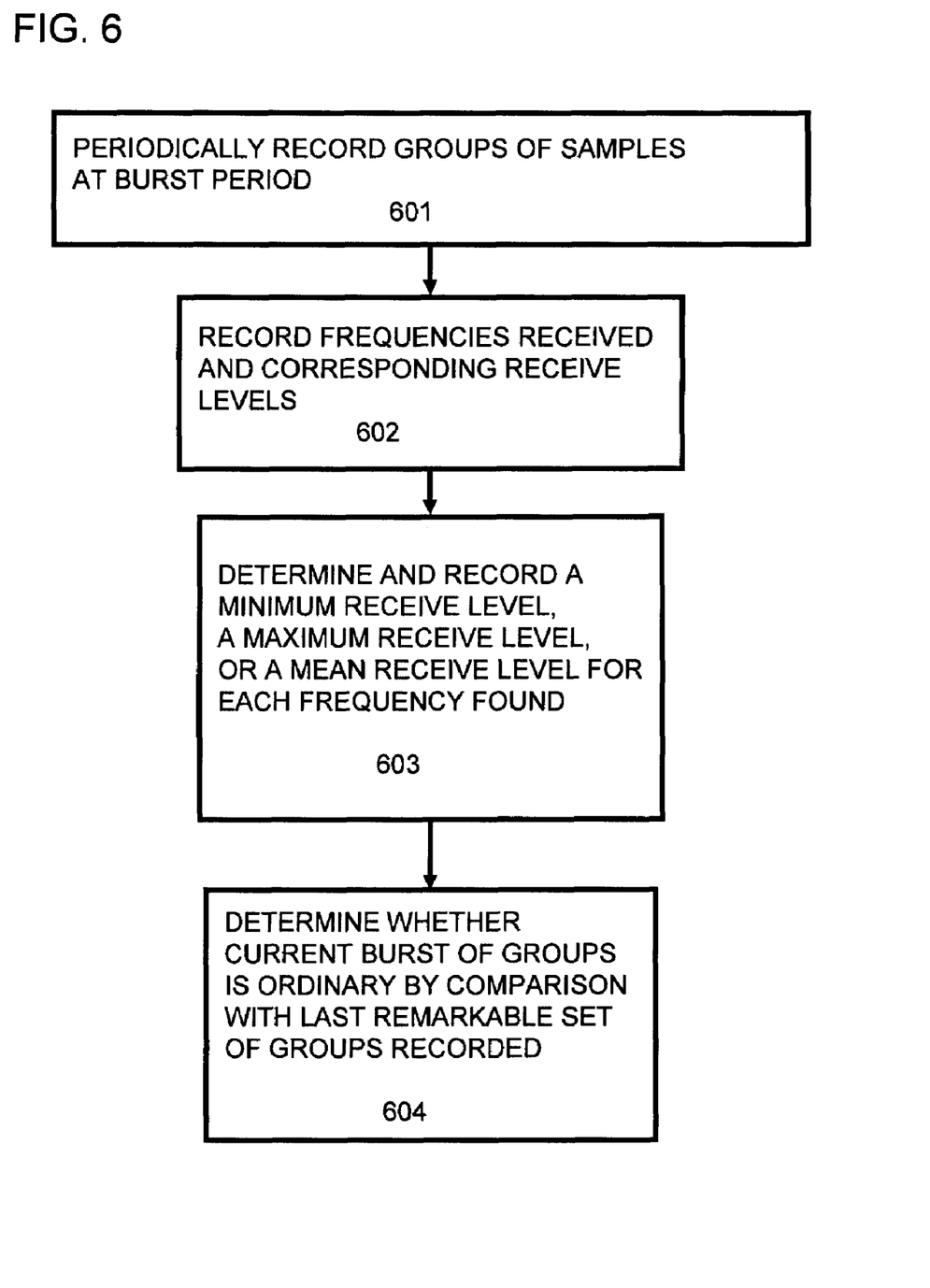
FIG. 6 represents a method of burst data processing, according to an exemplary embodiment of the present invention.

FIG. 6 illustrates a method of burst data processing, according to an exemplary embodiment of the present invention. Periodically, groups of samples are recorded at burst periods (601). At the burst periods, frequencies received and the corresponding receive levels are recorded (602). A maximum receive level, a minimum receive level, or a mean receive level for each frequency found is recorded (603). Using the recorded levels, it is determined whether the current burst of groups is ordinary by comparison with a last recorded remarkable set of remarkable groups (604).

A variant of the method of the invention is described next. As indicated above, in the current embodiment, the method is implemented in software form in a SIM card of the mobile portion of a GSM network mobile telephone. The number of stations that may be received at a geographical point covered by the network may be up to 32. The frequency information, in the form of channel numbers and receive levels or the value of the coefficients C1, C2, are accessible to the SIM card for only a small number of the frequencies that are actually received, for example of the order of seven frequencies or fewer. On the other hand, a small displacement or just a waiting time may suffice to change the identity of stations that are accessible to the SIM card. For example, at a time t1, the SIM card records six stations S1 to S6. A few seconds later, or a few meters further on, the identity and the levels transmitted to the SIM card may relate to the stations S1 to S4 and to two other stations S7 and S8. This feature is not necessarily limited to the GSM network. The embodiment of the invention that has just been described exploits this feature to increase the reliability of the presence or absence indications.

According to this variant, instead of comparing groups of samples with each other, bursts of groups of samples are compared with each other. To this end, during the operating phase and/or during the learning phase, a burst recording is made for each sample group operating routine periodic recording. A burst recording is a recording that is effected periodically, but at a much higher frequency, and thus at a period much shorter than the routine storage period. It is nevertheless necessary for the burst sampling period to remain greater than the network reselection period. In the GSM, that period is of the order of five seconds. For example, if the routine recording period is 60 seconds, the burst recording period could be of the order of five to ten seconds.

For each of the groups of samples of a burst, as in the case of a routine periodic recording, the frequencies received, the receive levels corresponding to those frequencies, and where applicable the coefficients C1, C2 are recorded.

For each of the frequencies occurring at least once in one of the q groups, at least one level $R_x$ is determined that may be one of the following: a minimum receive level $R_{min}$, a maximum receive level $R_{max}$, and a mean level $R_m$. For example, the minimum receive level $R_{min}$ is the receive level that is the lowest of l levels for a frequency found in a number l less than q of the q groups of samples of the burst, for example. The maximum receive level $R_{max}$ is the highest of the l levels. The mean level $R_m$ is obtained by averaging the l levels. The same procedure may be adopted for the coefficients C1 and C2. The levels obtained in this way are levels $R_x$ or $C_x$ of the burst.

This receive level value or these receive level values $R_x$ or $C_x$ are recorded for said burst.

For example, if, during the learning phase, the recording of remarkable groups is effected in bursts, to determine a next set of remarkable groups the value x of the current burst of groups is compared to the value $R_x$ of the same kind of the preceding set of remarkable groups. This presupposes, as in the general case, that a first set of remarkable groups has been determined.

A burst of current groups is declared ordinary, as opposed to remarkable, by comparing it to the last set of remarkable groups recorded if at least one or a combination of the following conditions is satisfied:

according to a first condition for comparing bursts of groups, the number of frequencies received for the set of current groups which are identical to frequencies received for the preceding remarkable set of groups is greater than a fixed percentage a %, according to a second condition, the number of frequencies received for the set of current groups that are different from the frequencies received for said preceding comparison set of remarkable groups is less than said fixed percentage b %, according to a third condition, there exists for a number t less than or equal to the number of frequencies present at the same time in the current burst of groups and in the preceding remarkable burst of groups a variation in receive level in less than a predetermined percentage threshold d% between a receive level associated with the current group and a receive level of the same kind associated with said comparison remarkable group.

If learning phases and operating phases are at the same time the subject of recording of groups in bursts, the level comparisons between a current group and the preceding remarkable set of groups is effected between levels of the same kind. For example, a current level $R_{min}$ is compared with a level $R_{min}$ of the remarkable set.

If only one of the recordings is effected with a burst of groups, it is accepted that the level value associated with a frequency according to the routine recording is at the same time the minimum, mean and maximum value.

The threshold level d % and the number t are preferably a function of the value of the receive level $R_x$ of comparison of the remarkable comparison group.

The invention claimed is:

1. A method of tracing a path to be taken by a mobile terminal capable of receiving electromagnetic waves transmitted by one or more transmitter stations, said path being traced by an operating platform, which method comprises:
   a learning phase comprising:
      an initial reconnaissance of the path during which, exclusively on said path, a periodic routine learning recording of successive groups of samples is made in a route memory accessible by said operating platform, a sample comprising at least one value of each of the frequencies received by said mobile terminal at each geographical position occupied by said mobile terminal at the time of said periodic recording and a receive level associated with said frequency, a periodic recording of rank k comprising a group k of $p_k$ samples, $p_k$ being an integer equal to the number of different frequencies received at the time of said recording, and
      a comparison of the received levels for a group of $P_n$ samples recorded during a current sampling of rank n and for at least one recorded preceding group of samples of rank lower than n, a comparison criterion discriminating between remarkable groups of samples and ordinary groups of samples, and
   an operating phase during which said mobile terminal takes said predefined path, said operating phase comprising:
      periodic routine operating recording of groups of $p_j$ operating samples, an operating sample comprising at least one value of each of the frequencies received by said mobile terminal at each geographical position it occupies at the time of said periodic operating recording and a receive level associated with said frequency, the number $p_j$ of samples being equal to the number of frequencies received during said operating recording of rank j,
      comparing each group of operating samples with at least one of said remarkable groups of samples, said comparison producing a positive comparison result if, according to the comparison criterion adopted for said learning phase, said comparison result indicates that said current group would have been classified as ordinary,
      recording a presence indication relating to whether said mobile terminal is on said path to be taken or not in the event of a positive comparison result and otherwise recording an absence indication, and
      processing one or more of the recorded presence or absence indications to decide if said mobile terminal is on said path to be taken or not.

2. The method claimed in claim 1 wherein said group or each of said groups of rank less than n with which said group of rank n is compared to determine whether said group of rank n is a remarkable group or not is a remarkable group, a first remarkable group of lowest rank r being determined other than by comparison with remarkable groups.

3. The method claimed in claim 2 wherein said first remarkable group is the first group to be recorded.

4. The method claimed in claim 3 wherein a remarkable group is determined by comparing the current group and the preceding remarkable group of samples having the highest remarkable group rank r.

5. The method according to claim 1 wherein a remarkable group is determined by successive two by two comparison of samples in the last i consecutive groups to be recorded, the last group of samples to be recorded having a rank n and the first of the last i groups having the rank n−1, said comparison yielding one or more remarkable groups.

6. The method claimed in claim 1 comprising:
a preparatory phase of recording in an operating memory accessible to said operating platform correlation information relating to each of said transmitter stations that may be received within a large geographical area encompassing at least a small geographical area in which said path to be taken is situated, said information alone or where applicable in combination with other prerecorded correlation information enabling correlation for said path to be taken of a frequency received with the identity of the station transmitting that frequency, and
during said learning phase, for said remarkable groups of samples, correlating the levels and the frequencies received with said correlation information recorded during said preliminary phase, said correlation linking each frequency and associated level of said remarkable group with an identifier of a station that transmitted them.

7. The method claimed in claim 1 wherein, during said learning phase:
the discrimination criterion for distinguishing a remarkable group from an ordinary group is as follows: a group is ordinary if at least one or a combination of the following conditions resulting from the comparison of a group of samples of rank n and the last identified remarkable group of samples is satisfied:
according to a first condition:
the number of frequencies received for the current group that are identical to frequencies received for said remarkable group is greater than a fixed percentage a %,
according to a second condition:
the number of frequencies received for the current group that are different from the frequencies received for said comparison remarkable group is less than said fixed percentage b %,
according to a third condition:
there exists a receive level percentage variation below a predetermined percentage threshold between a receive level associated with a frequency of the current group and a receive level associated with the same frequency of one of the samples of said remarkable comparison recording for a fixed minimum percentage c % of frequencies present in the remarkable sample and in the current sample, if the group has not been found ordinary, it is remarkable.

8. The method claimed in claim 7 wherein said learning phase extends over a plurality of passages over said path after the initial recording and if during one of said passages a current group which, given the variation of its rank after the last remarkable group to be recorded, should be an ordinary group is detected, as a function of the criteria employed, as being a remarkable group, then the user is interrogated to find out if he is on said path or not:
if he confirms that he is on the path to be taken, the user is invited to check a response, and
if the response is in the affirmative, at least one of the values comprising the level variation threshold, a %, b % and c % is modified in order for the comparison of the last remarkable group and said current group to yield an ordinary point.

9. The method claimed in claim 6 wherein said correlation information received by said mobile terminal includes information relating to the identity of a station that provides a particular service to said mobile terminal.

10. The method claimed in claim 9 wherein:
the criterion for discriminating between an ordinary group and a remarkable group is as follows: a group of samples is ordinary if at least one of the following conditions resulting from comparing a current group of samples and the preceding remarkable group of samples is satisfied:
according to a first condition:
the number of frequencies received for the current group that are identical to frequencies received for said remarkable group is greater than a fixed percentage a %,
according to a second condition:
the number of frequencies received for the current group that are different from the frequencies received for said comparison remarkable group is less than said fixed percentage b %,
according to a third condition:
there exists a receive level percentage variation below a predetermined percentage threshold between a receive level associated with a frequency of the current group and a receive level associated with the same frequency of one of the samples of said remarkable comparison recording for a fixed minimum percentage c % of frequencies present in the remarkable sample and in the current sample, if the group has not been found ordinary, it is remarkable,
according to a fourth condition:
it is found for said current group that the identity of said station providing said particular service is not identical to the identity of that which provided it for the comparison remarkable group.

11. The method claimed in claim 1 wherein values of one or more coefficients whose value or value variation is taken into account by said mobile telephone network to determine a change of station providing a particular service to said mobile terminal are recorded during said learning phase.

12. The method claimed in claim 11 wherein said conditions for declaring a group of recordings as remarkable further includes a variation above a fixed threshold of one or more of said coefficients whose value or value variation is taken into account by said mobile terminal to determine a change of a station providing a particular service to said mobile terminal.

13. The method claimed in claim 6 wherein, during said preliminary phase, values or ranges of values of parameters together defining a context space are recorded and, during learning or operating phases or during a preliminary configuration phase, a current situation in said context space is determined and the recording frequency is modified for subsequent recordings as a function of said current situation in said context space.

14. The method claimed in claim 13 wherein said values or ranges of values are chosen from one or more of the following context parameters:
residual battery charge value ranges,
values defining a location quality, and
remaining memory space value ranges.

15. The method claimed in claim 13 wherein the recording frequency is modified for subsequent recordings taking account of the number of frequencies received during a current recording and their respective levels.

16. The method claimed in claim 1 wherein, during the acquisition of remarkable groups of samples during said learning phase, an elapsed time from starting out along the path is recorded.

17. The method claimed in claim 1 wherein, for each periodic recording of groups of samples, during step 1a of said learning phase, a burst of recordings is made, said burst of recordings comprising a number q of groups of samples recorded periodically at a burst period such that the product of said burst period by the number q of records of said burst of records is less than half the routine period and, for each burst of groups of samples, the frequencies received and the receive levels corresponding to said frequencies are recorded, for each of the frequencies found at least once in one of the bursts of q groups, at least one level $R_x$ that may be a minimum receive level $R_{min}$, a maximum receive level $R_{max}$ or a mean receive level $R_m$ is determined and recorded for said burst of groups, and wherein, a first set of groups having been declared remarkable, a current burst of groups is declared ordinary, i.e. not remarkable, by comparison with the last remarkable set of groups recorded if at least one of the following conditions is satisfied:

according to a first condition for comparing bursts of groups, the number of frequencies received for the current burst of groups that are identical to frequencies received for said remarkable set of groups is greater than a fixed percentage a %, according to a second condition:

the number of frequencies received for the current burst of groups that are different from the frequencies received for said comparison remarkable burst of groups is less than said fixed percentage b %, according to a third condition:

for a number t less than or equal to the number of frequencies present both in the current burst of groups and in the preceding remarkable burst of groups, there exists a receive level variation percentage less than a predetermined threshold d % between a receive level associated with the current burst and a receive level of the same kind associated with said comparison remarkable burst.

18. The method claimed in claim 17 wherein the threshold level d % and the number t are functions of the comparison value of the receive level $R_x$ of the comparison remarkable group.

19. The method claimed in claim 6 wherein, during said preliminary phase, a combination of conditions is determined which, if they are satisfied, lead alone or in combination with other conditions to determining a remarkable point, and the values of the percentages a %, b % and c % are determined as a function of:

the quality of service,
the characteristics of the radio network,
the mean length of the paths,
the available memory space, and
the average remaining life of the battery of the mobile.

20. The method claimed in claim 16 wherein, during said operating phase, the result of comparing a current group and the preceding remarkable group is considered positive not only if, according to the comparison criterion adopted for said learning phase, the comparison result leads to determining that said current group would have been classed as ordinary, but also if the time elapsed since starting out on the path in the operating to reach said remarkable recording with which the current group is compared is equal, subject to a predetermined plus or minus margin, to the time elapsed during said learning phase from starting out on said path to reach the same remarkable record.

21. The method claimed in claim 1 wherein, during the operating phase, a burst of recordings is made for each periodic routine operating recording of groups of samples, said burst of recordings comprising a number q of groups of samples recorded periodically with a burst period such that the product of the burst period by the number q of recordings of said burst is less than half the routine operating period, and wherein, for each of the bursts of groups of samples:

the frequencies received and the receive levels corresponding to those frequencies are recorded, and for each of the frequencies found at least once in one of the bursts of q groups, at least one receive level $R_x$ that may be a minimum receive level $R_{min}$, a maximum receive level $R_{max}$ or a mean receive level $R_m$ is determined and recorded for said set of groups, and wherein a comparison result is positive if the comparison criteria applied for this comparison would have led, during the learning phase, to an ordinary group of samples, the receive levels of a remarkable group of samples that has not been determined by a learning burst record being considered in this case as constituting simultaneously a maximum level, a minimum level and a mean level.

22. The method claimed in claim 1 wherein, if none of the comparison results is positive, the comparison of the current group of samples with each of the other remarkable groups is resumed, a positive comparison result for the current group and one of the remarkable groups leading to a presence indication, and a non-presence indication is produced if none of the comparisons leads to a positive result.

23. The method claimed in claim 1 wherein, if none of the comparison results is positive, the comparison of the current group of samples with each of the other remarkable groups is resumed, a positive comparison result for the current group and one of the remarkable groups leading to a presence indication, and if none of the comparisons leads to a positive result, the comparison with the remarkable groups is resumed for a number h of subsequent operating groups and a presence indication is delivered if the ratio between h and the number of positive comparison results from the comparison with the h groups of operating samples for which a comparison has been effected is above a predetermined threshold, and a non-presence indication is delivered otherwise.

24. The method claimed in claim 1 wherein, if none of the comparison results is positive, the comparison of the current group of samples with each of the other remarkable groups is resumed, a positive comparison result for the current group and one of the remarkable groups leading to a presence indication, and if none of the comparisons leads to a positive result, the comparison with the noteworthy groups is resumed for a number h of subsequent operating groups and a presence indication is delivered if the ratio between h and the number of positive comparison results from the comparison with the h groups of operating samples for which a comparison has been effected is above a predetermined threshold, and if there is further noted a coherent progression of the rank of the remarkable groups for which a positive comparison result has been recorded, and a non-presence indication is delivered otherwise.

25. The method claimed in claim 23 wherein the number h is defined taking into account a service value contained in the context data recorded beforehand.

26. The method claimed in claim 1 comprising a step of deleting the recordings of ordinary groups of samples.

27. The method claimed in claim 1 wherein, during said learning phase, account is taken of the number of frequencies received for each of the current groups of samples and if this number falls to 0, indicating a shadow area of the telephone network, a counter of current groups of samples for which this number is equal to 0 is incremented and an operator of the network is sent a shadow area detection message after the first group of current samples for which the number of frequencies received is greater than 0.

28. A computer program comprising data processing program code means adapted to execute all the steps of claim 1 when said program is executed on a computer which may be located in a mobile terminal or a server.

29. The computer program claimed in claim 28 incorporated in a computer readable medium.

30. The computer program claimed in claim 28 incorporated into a plurality of computer readable media, each medium containing computer readable instructions, said instructions being adapted to execute some of the steps of said method, and connection instructions for sending data or instructions to the external environment.

31. A digital data medium or set of digital data media containing a program for executing the steps of the method as claimed in claim 1.

32. Use of the method as claimed in claim 1 wherein remarkable points covering a predetermined area are recorded, said operating phase of said method is awakened periodically, and information is transmitted to said mobile terminal if application of said method according to the invention leads to considering that said mobile terminal is in said predetermined area.

* * * * *